(12) United States Patent
Meyers

(10) Patent No.: US 12,545,087 B2
(45) Date of Patent: Feb. 10, 2026

(54) INSULATION COVER FOR A CAMPER

(71) Applicant: Paul Meyers, Airdrie (CA)

(72) Inventor: Paul Meyers, Airdrie (CA)

( * ) Notice: Subject to any disclaimer, the term of this patent is extended or adjusted under 35 U.S.C. 154(b) by 146 days.

(21) Appl. No.: 18/471,374

(22) Filed: Sep. 21, 2023

(65) Prior Publication Data
US 2025/0100363 A1 Mar. 27, 2025

(51) Int. Cl.
*B60J 11/06* (2006.01)

(52) U.S. Cl.
CPC ..................... *B60J 11/06* (2013.01)

(58) Field of Classification Search
CPC .......................................... B60J 11/06
USPC .......................................... 150/166
See application file for complete search history.

(56) References Cited

U.S. PATENT DOCUMENTS

| | | | | |
|---|---|---|---|---|
| 5,388,881 A * | 2/1995 | Spencer | ............... | B60J 7/104 |
| | | | | 296/79 |
| 5,791,361 A * | 8/1998 | Chong | ............... | B60J 11/00 |
| | | | | 296/136.01 |
| 7,036,867 B1 * | 5/2006 | Yang | ............... | B60J 11/00 |
| | | | | 296/136.11 |
| 9,333,840 B1 * | 5/2016 | Pino | ............... | B60J 7/104 |
| 9,889,732 B2 * | 2/2018 | Helb | ............... | B60J 11/04 |
| 10,471,816 B1 * | 11/2019 | Young | ............... | B60J 7/08 |
| 2002/0171259 A1 * | 11/2002 | Reich | ............... | B60R 11/00 |
| | | | | 296/136.05 |
| 2007/0085372 A1 * | 4/2007 | Dhanray | ............... | B60J 11/00 |
| | | | | 296/136.07 |
| 2008/0174144 A1 * | 7/2008 | Coleman | ............... | B60J 11/06 |
| | | | | 296/136.02 |
| 2013/0276286 A1 * | 10/2013 | Latuff | ............... | B60J 11/06 |
| | | | | 29/428 |
| 2022/0324371 A1 * | 10/2022 | Dadone | ............... | B60P 3/34 |

\* cited by examiner

*Primary Examiner* — Don M Anderson
*Assistant Examiner* — Justin Caudill
(74) *Attorney, Agent, or Firm* — CAPEHART LAW FIRM

(57) ABSTRACT

A cover for covering an extended portion of a camper is disclosed. The camper includes a body portion and the extended portion extending outwardly of the body portion. The cover includes a first cover portion including a central panel adapted to cover a roof of the extended portion and a pair of side panels arranged on opposite sides of the central panel and adapted to cover a pair of sidewalls of the extended portion. The cover also includes a second cover portion fixedly attached to the central panel and extending outwardly of the central panel and arranged between the pair of side panels. The second cover portion is configured to be removably engaged with the pair of side panels and is adapted to cover a rear wall of the extended portion.

15 Claims, 4 Drawing Sheets

INSULATION COVER FOR A CAMPER

BACKGROUND

1. Technical Field

The present disclosure relates, generally, to a cover for a camper, more particularly to an insulation cover for an extended portion of the camper.

2. Description of the Prior Art

Campers are popular among outdoor enthusiasts as they offer a compact and convenient living space while exploring different environments. The camper includes one or more extended portions extending outwardly of a main body portion of the camper, providing additional interior space. However, it is difficult to maintain a comfortable temperature inside the extended portions as the extended portion is generally made of fabric, and keeps the heated air from the furnace inside the trailer, and depends on the air conditioning system of the main body portion to maintain the temperature. Additionally, external noise coming from surrounding inside the extended portion may also cause sleep disturbance.

SUMMARY

One aspect of this disclosure relates to a cover for covering an extended portion of a camper. The camper includes a body portion and the extended portion extending outwardly of the body portion. The cover includes a first cover portion including a central panel adapted to cover a roof of the extended portion and a pair of side panels arranged on opposite sides of the central panel and adapted to cover a pair of sidewalls of the extended portion. The cover also includes a second cover portion fixedly attached to the central panel and extending outwardly of the central panel and arranged between the pair of side panels. The second cover portion is configured to be removably engaged with the pair of side panels and is adapted to cover a rear wall of the extended portion.

In some additional, alternative, or selectively cumulative embodiments, the cover is a reversible cover including a first surface and a second surface disposed opposite to the first surface. The first surface is a light reflecting surface and the second surface is a light absorbing surface.

In some additional, alternative, or selectively cumulative embodiments, the cover is made of a flexible material.

In some additional, alternative, or selectively cumulative embodiments, the cover further comprises a pair of zippers configured to removably engage the second cover portion with the pair of side panels.

In some additional, alternative, or selectively cumulative embodiments, the first cover portion includes a pair of seams coupling the central panel with the pair of side panels.

In some additional, alternative, or selectively cumulative embodiments, the first cover portion includes a first lateral edge, a second lateral edge arranged opposite to the first lateral edge, and a pair of the longitudinal edges extending from the first lateral edge to the second lateral edge. One of the pair of side panels extends from the central panel to a first longitudinal edge of the pair of longitudinal edges and other of the pair of side panels extends from the central panel to a second longitudinal edge of the pair of longitudinal edges.

In some additional, alternative, or selectively cumulative embodiments, the central panel extends from the second lateral edge of the first cover portion in a direction away from the first lateral edge of the first cover portion.

In some additional, alternative, or selectively cumulative embodiments, the cover further comprises at least one first strap attached to the first longitudinal edge of the first cover portion, and at least one second strap attached to the second longitudinal edge of the first cover portion. The at least one first strap and the at least second strap are adapted to be extended below a floor of the extended portion and are attached with each other to secure the cover with the extended portion.

In some additional, alternative, or selectively cumulative embodiments, the cover further includes a plurality of ratchet clamps to engage the cover with the extended portion and retain a first lateral edge of the first cover portion proximate to the body portion of the camper.

In accordance with an embodiment of the disclosure, a cover for covering an extended portion of a camper is disclosed. The camper includes a body portion and the extended portion extending outwardly of the body portion. The cover includes a first cover portion having a central panel adapted to cover a roof of the extended portion and a pair of side panels arranged on opposite sides of the central panel and adapted to cover a pair of sidewalls of the extended portion. The cover also includes a second cover portion fixedly attached to the central panel and extending outwardly of the central panel and arranged between the pair of side panels. The second cover portion is configured to be removably engaged with the pair of side panels and is adapted to cover a rear wall of the extended portion. Also, the cover is a reversible cover including a first surface and a second surface disposed opposite to the first surface. The first surface is a light reflecting surface and the second surface is a light absorbing surface.

In some additional, alternative, or selectively cumulative embodiments, the cover is made of a flexible material.

In some additional, alternative, or selectively cumulative embodiments, the cover further comprises a pair of zippers configured to removably engage the second cover portion with the pair of side panels.

In some additional, alternative, or selectively cumulative embodiments, the first cover portion includes a pair of seams coupling the central panel with the pair of side panels.

In some additional, alternative, or selectively cumulative embodiments, the first cover portion includes a first lateral edge, a second lateral edge arranged opposite to the first lateral edge, and a pair of the longitudinal edges extending from the first lateral edge to the second lateral edge. One of the pair of side panels extends from the central panel to a first longitudinal edge of the pair of longitudinal edges and other of the pair of side panels extends from the central panel to a second longitudinal edge of the pair of longitudinal edges.

In some additional, alternative, or selectively cumulative embodiments, the central panel extends from the second lateral edge of the first cover portion in a direction away from the first lateral edge of the first cover portion.

In some additional, alternative, or selectively cumulative embodiments, the cover further comprises at least one first strap attached to the first longitudinal edge of the first cover portion, and at least one second strap attached to the second longitudinal edge of the first cover portion. The at least one first strap and the at least second strap are adapted to be extended below a floor of the extended portion and are attached with each other to secure the cover with the extended portion.

In some additional, alternative, or selectively cumulative embodiments, the cover further includes a plurality of ratchet clamps to engage the cover with the extended portion and retain a first lateral edge of the first cover portion proximate to the body portion of the camper.

DETAILED DESCRIPTION

Figure 1:
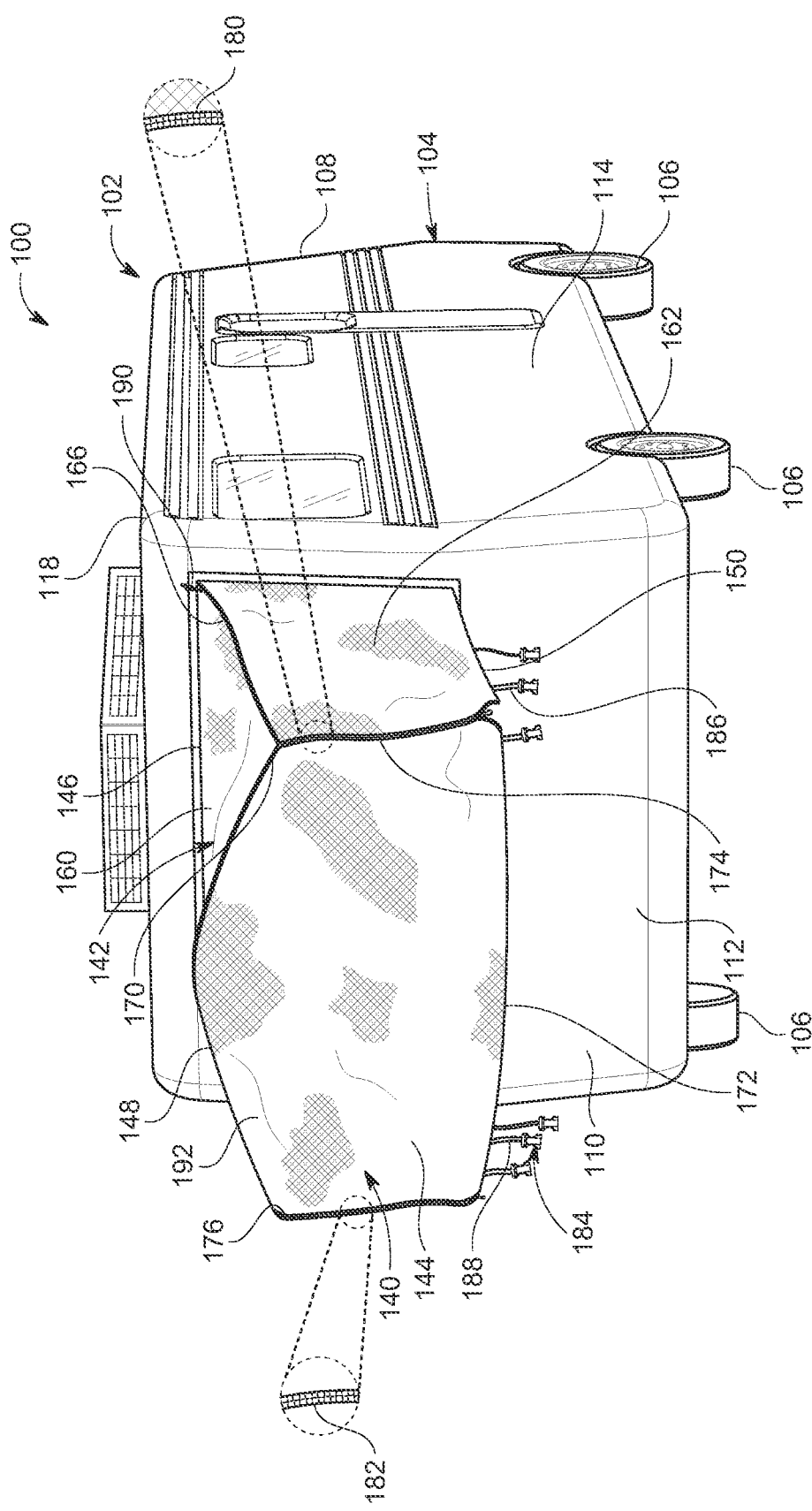
FIG. 1 illustrates a perspective view of a camper having a body portion and an extended portion extending outwardly of the body portion and a cover arranged over the extended portion with a first surface of the cover arranged facing an outside environment, in accordance with an embodiment of the disclosure.

Referring to FIGS. 1 to 4, a camper 100 configured to facilitate the sleeping of one or more passengers is shown. In some embodiments, the camper 100 may be a camper trailer 102 adapted to be towed behind a vehicle. Alternatively, the camper 100 may be integral to a vehicle, for example, a camper van. As shown, the camper 100 includes a body portion 104 defining a first chamber (not shown) and a plurality of traction members 106, for example, a plurality wheels 106, supporting the body portion 104 on a ground and facilitating a movement of the camper 100 over the ground. The body portion 104 includes a first end 108 (i.e., front end 108), a second end 110 (i.e., rear end 110), a front wall (not shown) arranged at the first end 108, a rear wall 112 arranged at the rear end 110, and a pair of sidewalls 114, 116 extending in a longitudinal direction from the front wall to the rear wall 112. Also, the body portion 104 includes a roof 118 supported on the walls 112, 114, 116 and covering the first chamber from top.

Figure 4:
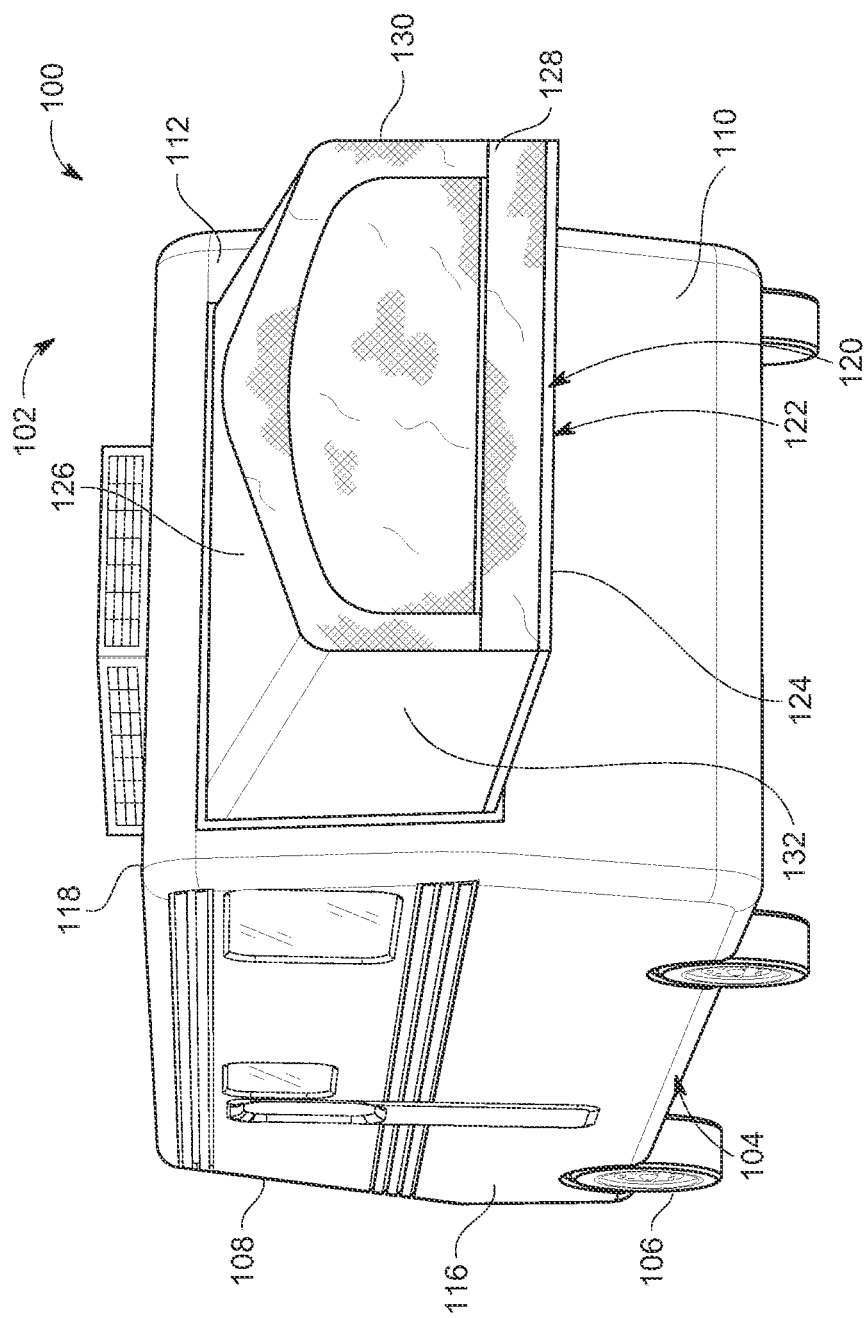
FIG. 4 depicts the camper of FIG. 1 with the cover removed from the extended portion of the cover, in accordance with an embodiment of the disclosure.

Moreover, as shown in FIG. 4, the camper 100 includes at least one extended portion 120, for example, a bed portion 122, configured to provide additional chamber to increase the accommodation space of the camper 100. As shown, the bed portion 122 is configured to extend rearwardly of the rear end 108 of the body portion 104 such that an interior of the bed portion 122 may be accessible through the first chamber. The bed portion 122 includes a floor 124, a roof 126 arranged opposite to the roof 126, a rear wall 128 arranged substantially parallel to the rear wall 112 of the body portion 104 and extending in a vertical direction. Moreover, the bed portion 122 also includes a pair of sidewalls 130, 132 extending in a longitudinal direction from the rear wall 128 of the bed portion 122 to the rear wall 112 of the body portion 104 and connecting the roof 126 to the floor 124. It may be appreciated that one or more walls, for example, the rear wall 128 may include one or more windows of the bed portion 122. In an embodiment, the extendable bed portion 122 may be made/constructed from a flexible material, such as, canvas, PVC etc.

Referring back to FIGS. 1 to 3, the camper 100 also includes a cover 140 arranged covering the bed portion 122 and is adapted to be removably engaged to the bed portion 122. As shown, the cover 140 includes a first cover portion 142 adapted to cover the sidewalls 130, 132 and the roof 126 of the bed portion 122, and a second cover portion 144 adapted to cover the rear wall 128 of the bed portion 122. The first cover portion 142 includes a first lateral edge 146, a second lateral edge 148 arranged opposite to the first lateral edge 146, and a pair of longitudinal edges, for example, a first longitudinal edge 150 (shown in FIGS. 1 and 2) and a second longitudinal edge 152 (shown in FIG. 3), extending from the first lateral edge 146 to the second lateral edge 148. In an assembly of the cover 140 over the bed portion 122, the first lateral edge 146 is arranged proximate to the rear wall 112 of the body portion 104, while the second lateral edge 148 is disposed distally to the rear wall 112 of the body portion 104. Moreover, the longitudinal edges 150, 152 are arranged along the longitudinal edges of the floor 124 of the bed portion 122.

As shown, the first cover portion 142 includes a central panel 160 adapted to cover the roof 126 of the bed portion 122 and a pair of side panels, for example, a first side panel 162 and a second side panel 164, arranged on either side of the central panel 160 and configured to cover the sidewalls 130, 132 of the bed portion 122. As shown, the first side panel 162 extends from the central panel 160 to the first longitudinal edge 150 of the first cover portion 142, while the second side panel 164 extends from the central panel 160 to the second longitudinal edge 152 of the first cover portion 142. In some embodiments, the first side panel 162 (shown in FIGS. 1 and 2) and the second side panel 164 (shown in FIG. 3) are joined to the central panel 160 via a pair of seams 166, 168. Accordingly, the seams 166, 168 define the boundary between the central panel 160 and corresponding side panels 162, 164. The seams 166, 168 facilitate in extension of the side panels 162, 164 substantially perpendicularly to the central panel 160 and enable an easy assembly of the cover 140 over the bed portion 122. However, it may be appreciated that the seams 166, 168 may be omitted, and the side panels 162, 164 are separated from the central panel 160 via virtual boundary lines.

Further, the second cover portion 144 is fixedly attached to the central panel 160 at the second lateral edge 148 and extends outwardly from the central panel 160 in a direction away from the first lateral edge 146. As shown, the second cover portion 144 includes a first lateral edge 170 engaged to the central panel 160, a second lateral edge 172 arranged opposite to the first lateral edge 170, a pair of longitudinal edges 174, 176 extending from the first lateral edge 170 to the second lateral edge 172. The second lateral edge 172 is arranged proximate to the floor 124 of the bed portion 122 in an assembly of the cover 140 with the bed portion 122, while the first longitudinal edge 174 and the second longitudinal edge 176 are removably engaged with the side panels 162, 164. To facilitate the removable engagement of the longitudinal edges 174, 176 of the second cover portion 144 with the side panels 162, 164, the cover 140 includes a pair of zippers, for example, a first zipper 180 and a second zipper 182, best shown in FIG. 1. The first zipper 180 facilitates the removable engagement of the first side panel 162 with the first longitudinal edge 174 of the second cover portion 144, while the second zipper 182 enables the removable engagement of the second side panel 164 with the second longitudinal edge 174 of the second cover portion 144. Although the zippers 180, 182 are shown and contemplated for removably engaging the side panels 162, 164 with the second cover portion 144, it may be envisioned that other engagement structures, for example, hooks, buttons, a loop and hook structures, or any other suitable structure known in the art may also be utilized.

Figure 2:
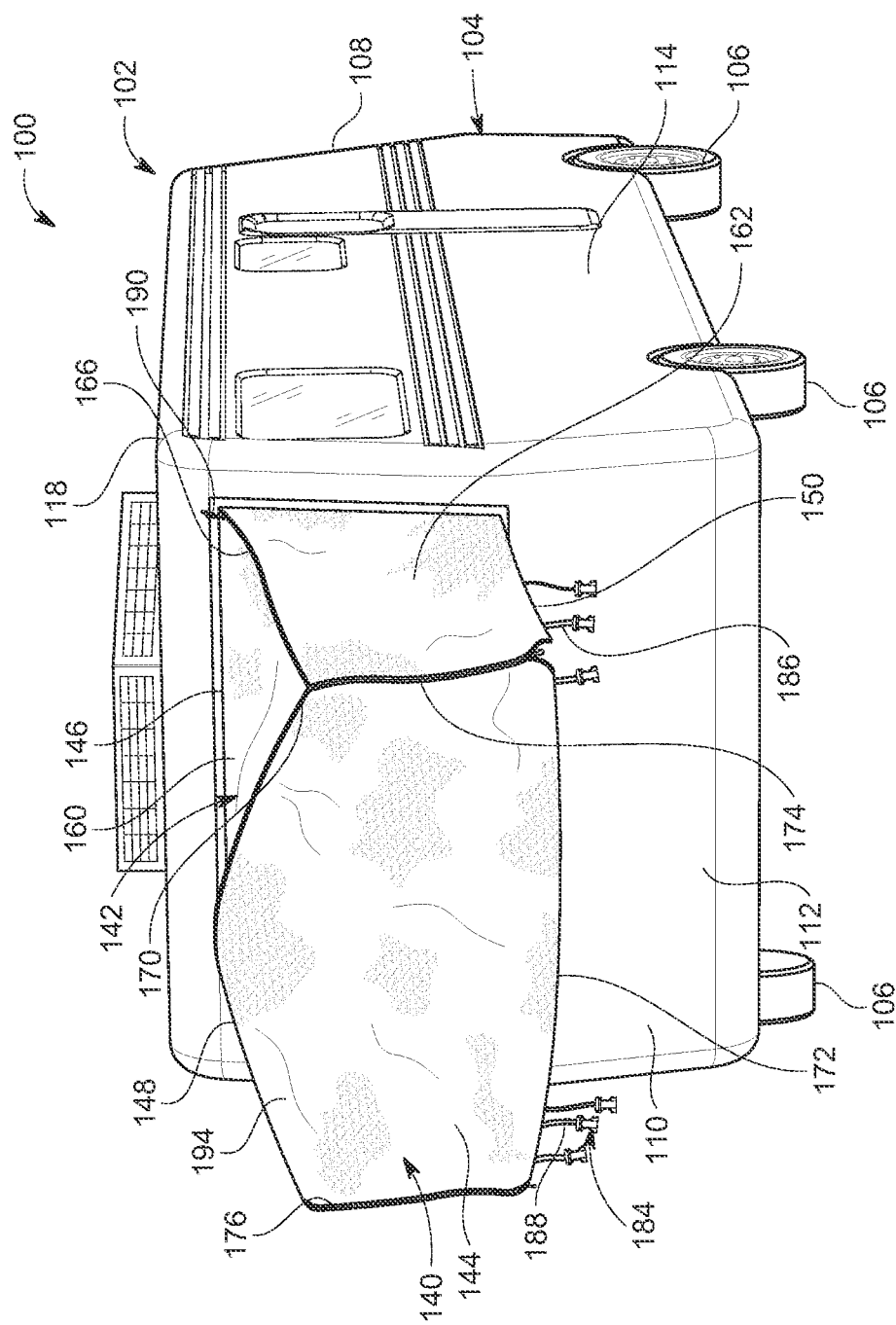
FIG. 2 illustrates a perspective view of the camper of FIG. 1 and the cover arranged over the extended portion with a second surface of the cover arranged facing an outside environment, in accordance with an embodiment of the disclosure.
Figure 3:
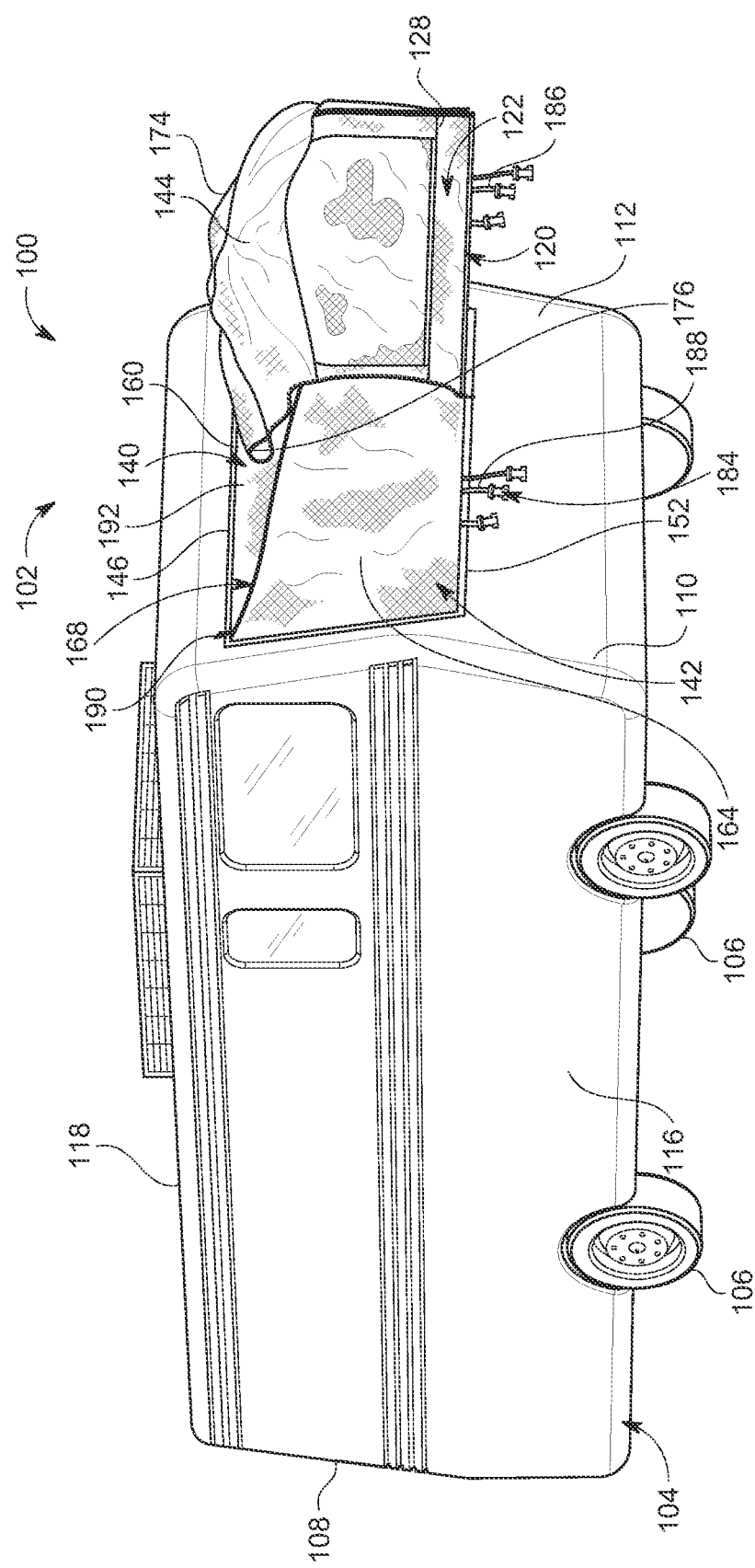
FIG. 3 illustrates a perspective view of the camper of FIG. 1 with a second cover structure of the cover of FIG. 1 arranged in an open position, in accordance with an embodiment of the disclosure.

Further, as shown in FIGS. 1 and 2, to secure the cover 140 with the bed portion 122, the cover 140 may include at least one engagement structure 184, for example, strap and buckle mechanism may be used. In an embodiment, the cover 140 may include at least one first strap 186 connected to the first longitudinal edge 150 of the first cover portion 142 and at least one second strap 188 connected to the second longitudinal edge 152 of the first cover portion 142. Moreover, a male buckle is attached at a first end of the first strap 186 and a female buckle may be attached to the second end of the second strap 188. To secure the cover 140 with the bed portion 122, the first strap 186 and the second strap 188 are extended below the floor 124 of the bed portion 122 and are engaged with each other by coupling the male buckle with the female buckle. In this manner, the side panels 162, 164 are tightly secured with the bed portion 122. Moreover, to retain the first lateral edge 146 of the first cover portion 142 engaged with the rear wall 112 of the body portion 104 and the central panel 160 with the roof 126 of the bed portion 122, a plurality of ratchet clamps 190 is arranged proximate to the first lateral edge 146 and at the intersections of the side panels 162, 164 with the central panel 160 such that the ratchet clamps 190 hold the cover 140 and the bed portion 122 together.

Further, the cover 140 is a reversible cover having a first surface 192 (shown in FIG. 1) and a second surface 194 (shown in FIG. 2) arranged opposite to the first surface 192. In one configuration, the cover 140 may be arranged covering the bed portion 122 such that the first surface 192 is arranged outside, while the second surface 194 abuts the bed portion. In a second configuration, the cover 140 may be arranged covering the bed portion 122 such that the first surface 192 is arranged abutting the bed portion, while the second surface 194 is arranged facing the exterior environment. In an embodiment, the first surface 192 includes a reflective surface configured to reflect the sun rays, while the second surface is an absorbing surface suitable to absorb the sun rays or light. Further, the cover 140 is a flexible cover and a heat insulating cover configured to restrict/reduce/prevent an exchange of the heat between the interior of the bed portion 122 and an ambient environment. Also, the cover 140 is made of noise absorbing material.

It should be understood that the foregoing description is only illustrative of the aspects of the disclosed embodiments. Various alternatives and modifications can be devised by those skilled in the art without departing from the aspects of the disclosed embodiments.

What is claimed is:

1. A cover for covering an extended portion of a camper, wherein the camper includes a body portion and the extended portion extending outwardly of the body portion, the cover comprising:
    a first cover portion including a central panel adapted to cover a roof of the extended portion and a pair of side panels arranged on opposite sides of the central panel and adapted to cover a pair of sidewalls of the extended portion;
    a second cover portion fixedly attached to the central panel and extending outwardly of the central panel and arranged between the pair of side panels, wherein the second cover portion is configured to be removably engaged with the pair of side panels and is adapted to cover a rear wall of the extended portion; and
    a pair of zippers configured to removably engage the second cover portion with the pair of side panels.

2. The cover of claim 1, wherein the cover is a reversible cover including a first surface and a second surface disposed opposite to the first surface, wherein the first surface is a light reflecting surface and the second surface is a light absorbing surface.

3. The cover of claim 1, wherein the cover is made of a flexible material.

4. The cover of claim 1, wherein the first cover portion includes a pair of seams coupling the central panel with the pair of side panels.

5. The cover of claim 1, wherein the first cover portion includes a first lateral edge, a second lateral edge arranged opposite to the first lateral edge, and a pair of the longitudinal edges extending from the first lateral edge to the second lateral edge, wherein one of the pair of side panels extends from the central panel to a first longitudinal edge of the pair of longitudinal edges and other of the pair of side panels extends from the central panel to a second longitudinal edge of the pair of longitudinal edges.

6. The cover of claim 1 further comprising a plurality of ratchet clamps to engage the cover with the extended portion and retain a first lateral edge of the first cover portion proximate to the body portion of the camper.

7. The cover of claim 1, wherein the central panel extends from the second lateral edge of the first cover portion in a direction away from the first lateral edge of the first cover portion.

8. The cover of claim 7 further comprises
    at least one first strap attached to the first longitudinal edge of the first cover portion, and at least one second strap attached to the second longitudinal edge of the first cover portion,
    wherein the at least one first strap and the at least second strap are adapted to be extended below a floor of the extended portion and are attached with each other to secure the cover with the extended portion.

9. A cover for covering an extended portion of a camper, wherein the camper includes a body portion and the extended portion extending outwardly of the body portion, the cover comprising:
    a first cover portion including a central panel adapted to cover a roof of the extended portion and a pair of side panels arranged on opposite sides of the central panel and adapted to cover a pair of sidewalls of the extended portion;
    a second cover portion fixedly attached to the central panel and extending outwardly of the central panel and arranged between the pair of side panels, wherein the second cover portion is configured to be removably engaged with the pair of side panels and is adapted to cover a rear wall of the extended portion,
        wherein the cover is a reversible cover including a first surface and a second surface disposed opposite to the first surface, the first surface being a light reflecting surface and the second surface being a light absorbing surface; and
    a pair of zippers configured to removably engage the second cover portion with the pair of side panels.

10. The cover of claim 9, wherein the cover is made of a flexible material.

11. The cover of claim 9, wherein the first cover portion includes a pair of seams coupling the central panel with the pair of side panels.

12. The cover of claim 9, wherein the first cover portion includes a first lateral edge, a second lateral edge arranged opposite to the first lateral edge, and a pair of the longitudinal edges extending from the first lateral edge to the second lateral edge, wherein one of the pair of side panels extends from the central panel to a first longitudinal edge of the pair of longitudinal edges and other of the pair of side panels extends from the central panel to a second longitudinal edge of the pair of longitudinal edges.

13. The cover of claim 12, wherein the central panel extends from the second lateral edge of the first cover portion in a direction away from the first lateral edge of the first cover portion.

14. The cover of claim 12 further comprises
- at least one first strap attached to the first longitudinal edge of the first cover portion, and at least one second strap attached to the second longitudinal edge of the first cover portion,
- wherein the at least one first strap and the at least second strap are adapted to be extended below a floor of the extended portion and are attached with each other to secure the cover with the extended portion.

15. The cover of claim 9 further comprising a plurality of ratchet clamps to engage the cover with the extended portion and retain a first lateral edge of the first cover portion proximate to the body portion of the camper.

* * * * *